April 15, 1947.　　　J. L. QUINN ET AL　　　2,419,035
MANUFACTURE OF MOLDING POWDERS

Filed July 25, 1942

PROCESS STEPS

FIG. 1.

HOMOGENIZING

SUBDIVIDING

SEASONING

COMMINUTING

FIG. 2.
HOMOGENIZING-SUBDIVIDING STEPS-ALTERNATIVES

| A | B | C |
|---|---|---|
| HOMOGENIZE IN DOUGH MIXER | HOMOGENIZE IN DOUGH MIXER | BLEND IN LIGHT MIXER HOMOGENIZE IN SCREW STUFFER |
| SUBDIVIDE IN DOUGH MIXER | SUBDIVIDE BY SCREW STUFFER | SUBDIVIDE BY SCREW STUFFER |

INVENTORS
JOSEPH L. QUINN &
EWALD G. SPADER
BY

ATTORNEY

Patented Apr. 15, 1947

2,419,035

UNITED STATES PATENT OFFICE 2,419,035

MANUFACTURE OF MOLDING POWDERS

Joseph L. Quinn, Matawan, and Ewald G. Spader, Roselle Park, N. J., assignors to E. I. du Pont de Nemours & Company, Wilmington, Del., a corporation of Delaware Application July 25, 1942, Serial No. 452,360

6 Claims. (Cl. 18—47.5)

This invention relates to the manufacture of molding powders, and, more particularly, to an improved method for the manufacture of such molding powders from esters and ethers of cellulose.

The term "molding powders" is used herein to embrace pulverulent or, more usually, granular materials, substantially free from volatile solvent, which are capable of being welded by heat and pressure into continuous homogeneous masses and are thus suited to the techniques of compression and/or injection molding.

The invention is applicable to derivatives of cellulose, such as cellulose acetate, cellulose acetate butyrate, and ethyl cellulose, which are recognized as suitable for the manufacture of molding powders, but will ordinarily not be applied to cellulose nitrate, not because it is not analogously applicable thereto as a manufacturing procedure, but because that ester is not suited to the technique of molding from comminuted form except in conjunction with a content of plasticizer which is undesirably large for most purposes.

The invention is thus primarily applicable to the esters and ethers of cellulose, referred to in the claims hereinafter as soluble derivatives of cellulose.

In commercial practice, several important requirements must be met by such molding powders. The essential ingredients, namely, cellulose derivative and plasticizer, and any permanent auxiliary ingredient, must be completely homogeneously blended; included in this requirement is the necessity that any pigment used for purposes of coloration be uniformly dispersed so that an article made from the molding powder shall be free from irregularities of color and from visible particles of undistributed pigment. The molding compound must be substantially free from volatile solvent since the presence of more than a trace of such solvent, although it may facilitate the operation of molding, is objectionable because its subsequent evaporation from the molded article will cause distortion. A further requirement is that the molding powder be furnished to the trade in an acceptable granulation; the specific character of the granulation will depend to some extent upon the method and equipment by which it is to be molded, but in almost every case it is required that the granular molding compound be as nearly as possible uniform in granulation and bulk-density, that it contain no excessively coarse particles, and particularly that it be comparatively free from very fine particles.

The necessity of meeting these requirements has made the manufacture of such molding compounds laborious and expensive. If the thorough mastication required to insure the necessary homogeneity is carried out in the absence of volatile solvent, the power consumption is high and the internal friction within the mass is likely to develop temperatures high enough to cause discoloration of coloring ingredients, or even of the cellulose derivative itself. If volatile solvent is used to facilitate the homogenization, it must subsequently be removed, and this step of seasoning involves delay and expense, particularly because it must be conducted in such a way as to prevent the material in the course of seasoning from cohering, by reason of its content of volatile solvent, into an untractable mass from which the elimination of solvent is slow and incomplete. The problem of controlling the granulation within acceptable limits has been difficult because of the difficulty of reducing random masses to granules within a desired range of size; efforts to avoid insufficient comminution, with production of undesirably coarse particles, lead easily to over-grinding, and the resulting production of an undesirable proportion of very fine particles.

It is an object of the present invention to provide an improved, practicable, economical and readily controlled method for the production of granular molding compounds of cellulose acetate and other suitable cellulose derivatives, and, specifically, one by which it becomes relatively easy to meet the several requirements set forth above. Other objects will be apparent from the description of the invention given hereinafter.

The above objects are accomplished according to the present invention by forming a homogeneous mass of a cellulose derivative, a plasticizer therefor, auxiliary ingredients if desired, and a hot-acting solvent therefor, at a temperature above the effective temperature of the solvent, subdividing the homogeneous mass into a form characterized by large ratio of surface to volume, seasoning the subdivided mass at a temperature below the effective temperature of the solvent, and then comminuting same to the desired granulation.

By "hot-acting solvent" is meant a relatively volatile liquid, or, more usually, a mixture of liquids, which exerts distinct solvent action only at temperatures above a fairly well defined temperature, characteristic of the combination of cellulose derivative, plasticizer, and solvent. This latter temperature is referred to herein as the "effective temperature." The solubility characteristics of the cellulose derivative, and the nature and proportion of the plasticizer, will influence the effective temperature of a given hot-acting solvent.

There are several specific methods of carrying out the present invention but they all involve the essential steps of (1) formation into a homogeneous mass of the cellulose derivative and other components in the presence of a hot-acting solvent, (2) subdivision of the mass into a form characterized by large ratio of surface to volume, and (3) seasoning of the plastic; generally, there will be a step (4) consisting of comminuting the subdivided mass to obtain the desired granulation. The order of steps (3) and (4) may be reversed.

One method of forming the ingredients into a homogeneous mass is by masticating them in a standard dough mixer at a temperature above the effective temperature of the hot-acting solvent. As is known to those skilled in the art, it is quite feasible, through the action of a standard dough mixer, to prepare a dough of cellulose derivative, plasticizer, and solvent which will be homogeneous with respect to these ingredients. A uniform distribution of color also can be achieved; coloring ingredients of a soluble type are introduced in solution in a suitable solvent, the amount of which is ordinarily so very small as to have no significant influence upon the composition of the main solvent; insoluble coloring ingredients are previously thoroughly dispersed, e. g. on mixing rolls, in a convenient small piece of dough of the cellulose derivative, and the resulting lump of colored dough, soft enough to blend with the main body of the dough being prepared in the mixer, is added to the mixer with the other ingredients and subsequently becomes homogeneously distributed therein.

The simplest manner in which the homogeneous dough formed in the mixer can be subdivided into a form characterized by relatively large surface area to volume is to cool the contents of the mixer, by circulation of cold water through its jacket, and at the same time to reverse the rotation of the paddles of the mixer. Lowering the temperature of the homogeneous dough causes it to lose its coherence, through lessening of the solvent power of its hot-acting solvent, and the reverse rotation of the blades promotes its breakdown into small pieces, which may then be subjected to a seasoning treatment, and thereafter comminuted if necessary. The practical difficulty with this simplest embodiment of the invention is the tendency of the dough to break down uncontrollably into extremely small fragments, with the result that the mass of fragments, after having been seasoned, contains too large a percentage of fine particles to be generally acceptable in molding operations. When, however, a specific molding process will tolerate a granular molding powder containing a large percentage of fines, then this simple embodiment of the invention is directly and advantageously useful.

It is ordinarily preferred to maintain control of the character of the finally granulated product, although at the cost of two additional operations. To this end the homogeneous dough, conveniently broken up by reversal of the mixer, is fed into a screw stuffer of the type familiar in the operations of manufacture of plastics and rubber, and discharged from it through small orifices in the form of strands or ribbons of relatively large surface area and of cross-sectional dimensions which promote subsequent comminution into fragments of dimensions desired in the molding powder which is to be produced.

The strands or ribbons can be seasoned as such, and then comminuted by passage through a suitable grinder, but preferably they are cut into small granules immediately upon issuing from the orifices of the screw stuffer, or soon thereafter. The granules thus produced will, of course, by reason of their larger ratio of surface to volume, be even more readily seasoned than the uncut strands.

In neither case is trouble encountered with coherence of the material during seasoning. The temperature of the subdivided mass issuing from the screw stuffer is rapidly depressed below the "effective temperature" at which the solvent power of the solvent is sufficient to make the material sticky, and a bundle of strands or ribbons immediately laid down upon a seasoning tray, or the fragments resulting from immediate cutting of the strands, will not stick together. Accordingly, the relatively large surface offered by the mass in either of these forms is not impaired by coalescence, and the material enters upon the seasoning operation in a form favorable for the rapid accomplishment of the thorough removal of solvent.

The temperature of the subdivided mass is maintained, at all times throughout the seasoning, below the effective temperature of the solvent contained in its surface layer, in order to prevent it from sticking together. When, as is usual, the solvent used initially is a mixture, its composition is subject to change, in the course of the seasoning, by inequality of evaporation of its components. When, as is preferable, the hot-acting solvent contains a non-solvent, such as water, which is less volatile than its other component, then the change in composition of the solvent during the seasoning weakens its solvent power, raises its effective temperature, and permits of increasing the temperature of the mass, during the course of the seasoning, without exceeding the effective temperature of the solvent currently present in the surface layer.

Functionally speaking, seasoning begins with the first exposure of the subdivided mass to an atmosphere into which solvent can evaporate, and thus it begins immediately upon the issuance of extruded strands from the stuffer, and prior to the delivery of the subdivided mass into the seasoning equipment proper. At this beginning of the evaporation, the temperature of the subdivided mass must be kept below the effective temperature of the initial solvent, in order to prevent coalescence of the mass. But the relatively rapid evaporation which takes place at this time results in decrease in the activity of the solvent at the surface, and a gradual increase in temperature may thereafter be applied, in order to hasten the seasoning, and the temperature of the mass toward the end of the seasoning treatment may be considerably above the highest which could safely have been used at the start of the seasoning.

By reason of the latent heat of vaporization of the solvent the temperature of the subdivided material during the early stages of seasoning is always well below the temperature of the warm air supplied to the seasoning equipment.

It is ordinarily feasible to start the seasoning of the strands or cut fragments by application of air at temperatures as high as 75° C. A still higher temperature, up to 81° C. or above, can ordinarily be used in the later stages of seasoning without risk of causing coalescence or discoloration of the product. Seasoning in any event is continued until the solvent content of the product is reduced to an acceptable point, normally not in excess of 0.2%, and more usually below 0.1%.

A second method of forming the ingredients into a homogeneous mass is through the use of a screw stuffer, the dough mixer being eliminated in this embodiment of the invention. The ingredients are blended together in a simple light mixer at a temperature at which the solvent does not take effect upon the cellulose derivative. The resulting loose, moist, uniform mixture is then charged into a screw stuffer of a type which provides a severe masticating action, and is suitably heated. In the course of its passage through this screw stuffer the mass is converted into a dough, which issues from orifices as in the preferred method and is thereafter similarly handled.

Practically speaking, the only shortcoming of this method, which is somewhat more cheaply operated than the preferred method, is the greater risk of incompleteness of homogenization, particularly with respect to coloring ingredients. If the stuffer is of the proper type and of sufficient length, and if the ingredients have been uniformly blended before being introduced into the stuffer, homogeneity with respect to cellulose derivative, plasticizer and solvent is readily achieved by this method, and homogeneity with respect to coloring ingredients is promoted by suitable precautions.

In particular, the dispersion of pigment colors is promoted by the use of the technique of United States Patent 2,109,592 of M. L. Macht and A. F. Randolph, in which the dry pigment is thoroughly ballmilled with a small portion of the dry cellulose derivative, and the resulting mixture, in which the individual particles of pigment are well separated from each other, is blended uniformly with the remainder of the batch.

It will be evident that the size of the granules of molding powder made by those specific procedures involving extruding the mass in the form of strands or ribbons, is readily controlled through selection of orifice size to yield extruded strands of desired cross-sectional dimensions and through selection of equipment and procedure for cutting these strands into granules. And, particularly when the cutting of strands into granules is done by suitable equipment while the material is still relatively soft, the granules can be made substantially uniform in size. This control of size makes it feasible to produce, by the method of the invention, a molding powder approaching or meeting a predesignated specification as to granulation and bulk-density, and markedly superior in uniformity to those made by the usual technique of grinding of masses of seasoned material of random and irregular size and shape. This uniformity, and the absence of unwanted fines, make unnecessary a screening of the product.

The selection of a hot-acting solvent will be made, by one skilled in the art, on the basis of simple experimentation. The choice will be influenced not only by the identity and solubility characteristics of the cellulose derivative to be used, and of the plasticizer, but also by which of the alternative embodiments of the procedure is to be followed, and by the characteristics of the equipment available. For use with appropriate cellulose derivatives now available, the hot-acting solvent will normally, if not invariably, be a mixture of volatile liquids comprising a solvent and a non-solvent. A mixture of ethyl alcohol and water, in proportions determined by experimentation as indicated above, will normally be used when operative, both because such a mixture is inexpensive and because its solvent component is more volatile than its non-solvent component. The advantage of a mixture of this type has already been explained.

The amount of hot-acting solvent to be used, per 100 parts of cellulose derivative, will be selected to fit a particular embodiment of the process in specific equipment, and will ordinarily be between about 30 and about 70 parts. The smaller the amount which can be used, the more quickly can the necessary seasoning be completed.

When the use of the dough mixer is eliminated, it will usually be feasible to use less solvent.

Reference is made to the accompanying drawing wherein:

Fig. 1 shows the successive steps for carrying out the process of this invention; and Fig. 2 shows three of the above specific methods whereby the first two steps of the process may be carried out.

As shown in Fig. 1, the process broadly comprises the steps of homogenizing, subdividing, seasoning and comminuting the plastic, the order of the last two steps being reversible as mentioned above. The two steps of homogenizing and subdividing may be carried out in alternate ways as previously described. This is illustrated in Fig. 2.

The following examples illustrate specific embodiments of the invention, all parts being given by weight unless otherwise specified:

Example 1

The following ingredients are employed:

| | Parts |
|---|---|
| Cellulose acetate (acetic number 57.0) | 100 |
| Dimethyl phthalate | 8 |
| Diethyl phthalate | 24 |
| Hot-acting solvent: | |
| Methyl acetate | 36 |
| Ethyl alcohol (2B denaturated) | 20 |

The cellulose acetate used in this example is of the type referred to as having a high acetic number.

The above ingredients are charged into a standard W. & P. dough mixer provided with a hot water jacket and are masticated at a temperature of 75° C. for fifteen minutes, at the end of which time a homogeneous dough has been prepared. Cool water is then flowed through the jacket and the blades of the mixer are reversed to break up the plastic into pieces, the majority of which are less than ⅛ inch in diameter. These are then fed into a screw stuffer and extruded therefrom at a temperature of about 82° C. in the form of strands of 3/16 inch diameter, which strands are cut into pieces of ⅛ inch length as they issue from the orifice of the screw stuffer. The pieces of plastic thus formed are then seasoned in air at a temperature of 80° C. for twenty hours. The seasoned pieces of plastic have a solvent content below 0.1%.

In the above example details of the procedure have been given since this example illustrates a preferred embodiment of the invention. As the specific conditions of temperature, time, and the like, will be apparent to those skilled in the art in view of the foregoing extended discussion of the various factors involved in carrying out the different procedures coming under the present invention, the following examples only give the specific compositions employed together with the statement of which specific procedure should be used.

Example 2

| | Parts |
|---|---|
| Cellulose acetate (acetic number 54.5) | 100 |
| Dimethyl phthalate | 31.5 |
| Diethyl phthalate | 13.5 |
| Hot-acting solvent: | |
| Ethyl alcohol (2B) | 42.0 |
| Water | 8.0 |

This mixture is converted to a granular molding powder by the procedure set forth in Example 1.

The cellulose acetate used in this example is of the type referred to as having a low acetic number.

Example 3

| | Parts |
|---|---|
| Cellulose acetate (acetic number 54.5) | 100 |
| Dimethyl phthalate | 31.5 |
| Diethyl phthalate | 13.5 |
| Hot-acting solvent: | |
| Ethyl alcohol (2B) | 25.6 |
| Water | 6.4 |

This mixture is converted into granular molding powder by blending the ingredients in a simple light mixer and thereafter masticating them to obtain a homogeneous mass in a screw stuffer from which the mass is extruded in the form of strands and the procedure continued as in Example 1.

Example 4

| | Parts |
|---|---|
| Cellulose acetate (acetic number 54.5) | 100 |
| Dimethyl phthalate | 31.5 |
| Diethyl phthalate | 13.5 |
| Hot-acting solvent: | |
| Ethyl alcohol (2B) | 42.0 |
| Water | 12.0 |

This mixture is converted into granular molding powder according to the procedure of Example 1.

Example 5

| | Parts |
|---|---|
| Ethyl cellulose (ethoxyl 44–45%) | 100 |
| Diamyl phthalate | 16.5 |
| Hot-acting solvent: | |
| Ethyl alcohol (2B) | 44.0 |
| Water | 20.0 |

Procedure as in Example 1.

Example 6

| | Parts |
|---|---|
| Cellulose acetate butyrate (acetyl 0.82 mol, butyryl 2.14 mols, per mol of cellulose) | 100 |
| Dibtuyl sebacate | 17 |
| Hot-acting solvent: | |
| Ethyl alcohol (2B) | 44 |
| Water | 30 |

Procedure as in Example 1.

It will be understood that the above examples are merely illustrative and the present invention broadly comprises the steps of forming the ingredients into a homogeneous mass in the presence of a hot-acting solvent and at a temperature above the effective temperature of such solvent, subdividing the homogeneous mass into a form characterized by large ratio of surface to volume, and seasoning the subdivided mass at a temperature below the effective temperature of the solvent. Generally, a fourth step will be involved, namely comminuting the plastic to the desired granulation for use as a molding powder and this may be done either before or after the seasoning step.

The use of either a dough mixer or a properly designed screw stuffer to form the ingredients into a homogeneous mass is clearly preferred although it is within the scope of the invention to employ other forms of apparatus for accomplishing this same purpose. Also, other means than those disclosed may be used for subdividing the homogeneous mass into a form convenient for the seasoning step but the extrusion of the homogeneous mass into strands of small cross-section and cutting these strands by means of a rotating knife affixed to the screw stuffer immediately as the strands are formed, into small lengths, has been found most practical since it gives positive control of the size of the granules of the molding powder and, likewise, control of the bulk-density of the molding powder.

An advantage of the present invention is that it provides an economical and reliable method of preparing cellulose derivative molding powders free from volatile solvent and of desirable granulation. A particular advantage of this method is that it derives all the benefits flowing from the use of a volatile solvent in forming the ingredients of the plastic into a homogeneous mass and yet avoids the objections heretofore encountered in the use of volatile solvents for this purpose.

As many apparently widely different embodiments of this invention may be made without departing from the spirit and scope thereof, it is to be understood that the invention is not limited to the specific embodiments thereof except as defined in the appended claims.

We claim:

1. Process of manufacturing a molding powder which comprises mixing in a dough mixer a soluble derivative of cellulose from the group consisting of cellulose esters of organic acids and cellulose ethers, a plasticizer therefor, and a hot-acting volatile solvent therefor, at a temperature above the effective temperature of said solvent to form a homogeneous mass, cooling said mass below the effective temperature of said solvent and breaking said mass down into small pieces, feeding said pieces into a screw stuffer and extruding therefrom at a temperature above the effective temperature of said solvent strands of small cross-section, cutting said strands into granules, and seasoning said granules at a temperature below the effective temperature of said solvent.

2. Process of manufacturing a molding powder which comprises mixing in a screw stuffer a soluble derivative of cellulose from the group consisting of cellulose esters of organic acids and cellulose ethers, a plasticizer therefor, and a hot-acting volatile solvent therefor, at a temperature above the effective temperature of said solvent to form a homogeneous mass, extruding said homogeneous mass in the form of strands of small cross section, cutting said strands into granules, and seasoning said granules at a temperature below the effective temperature of said solvent.

3. Process of manufacturing a molding powder which comprises mixing in a dough mixer a soluble derivative of cellulose from the group consisting of cellulose esters of organic acids and cellulose ethers, a plasticizer therefor, and a hot-acting volatile solvent therefor, at a temperature above the effective temperature of said solvent to form a homogeneous mass, cooling said mass below the effective temperature of said solvent while continuing said mixing whereby said mass is broken down into small pieces, feeding said pieces into a screw stuffer and extruding therefrom at a temperature above the effective temperature of said solvent strands of small cross section, cutting said strands into granules, and seasoning said granules at a temperature below the effective temperature of said solvent.

4. Process of manufacturing a molding powder which comprises mixing in a dough mixer a soluble derivative of cellulose from the group consisting of cellulose esters of organic acids and cellulose ethers, a plasticizer therefor, and from 30 to 70 parts, per 100 parts of said derivative of cellulose, of a hot-acting volatile solvent therefor, at a temperature above the effective temperature of said solvent to form a homogeneous mass, cooling said mass below the effective temperature of said solvent and breaking said mass down into small pieces, feeding said pieces into a screw stuffer and extruding therefrom at a temperature above the effective temperature of said solvent strands of small cross-section, cutting said strands into granules, and seasoning said granules at a temperature below the effective temperature of said solvent.

5. Process of manufacturing a molding powder which comprises mixing in a dough mixer cellulose acetate having an acetic number of approximately 54.5 to 57, a plasticizer therefor, and from 30 to 70 parts, per 100 parts of said cellulose acetate, of a hot-acting volatile solvent therefor, at a temperature above the effective temperature of said solvent to form a homogeneous mass, cooling said mass below the effective temperature of said solvent and breaking said mass down into small pieces, feeding said pieces into a screw stuffer and extruding therefrom at a temperature above the effective temperature of said solvent strands of small cross-section, cutting said strands into granules, and seasoning said granules at a temperature below the effective temperature of said solvent.

6. Process of manufacturing a molding powder which comprises mixing in a dough mixer a cellulose acetate, a plasticizer therefor, and from 30 to 70 parts, per 100 parts of cellulose acetate, of a hot-acting volatile solvent comprising ethyl alcohol and water, at a temperature above the effective temperature of said solvent to form a homogeneous mass, cooling said mass below the effective temperature of said solvent and breaking said mass down into small pieces, feeding said pieces into a screw stuffer and extruding therefrom at a temperature above the effective temperature of said solvent strands of small cross-section, cutting said strands into granules, and seasoning said granules at a temperature below the effective temperature of said solvent.

JOSEPH L. QUINN.
EWALD G. SPADER.

REFERENCES CITED

The following references are of record in the file of this patent:

UNITED STATES PATENTS

| Number | Name | Date |
|---|---|---|
| 2,110,570 | Eichengrun | Mar. 8, 1938 |
| 1,510,779 | Herrmann | Oct. 7, 1924 |
| 2,215,573 | Beck | Sept. 24, 1940 |
| 2,319,040 | Conklin | May 11, 1943 |
| 2,045,628 | Alfthan | June 30, 1936 |
| 2,151,476 | Kimble et al. | Mar. 21, 1939 |
| 2,065,664 | Dickie et al. | Dec. 29, 1936 |
| 1,953,956 | Dreyfus | Apr. 10, 1934 |
| 1,913,478 | Dorr et al. | June 13, 1933 |
| 247,734 | Kanouse | Sept. 27, 1881 |

FOREIGN PATENTS

| Number | Country | Date |
|---|---|---|
| 12,976 | British | Dec. 31, 1909 |
| 1,441 | British | July 14, 1910 |